United States Patent
Nikkhah

(10) Patent No.: US 6,935,767 B2
(45) Date of Patent: Aug. 30, 2005

(54) STIR STICK ASSEMBLY FOR BLENDER APPARATUS

(75) Inventor: Ali Nikkhah, Mission Viejo, CA (US)

(73) Assignee: Sylmark Holdings Limited (IE)

( * ) Notice: Subject to any disclaimer, the term of this patent is extended or adjusted under 35 U.S.C. 154(b) by 0 days.

(21) Appl. No.: 10/821,384

(22) Filed: Apr. 9, 2004

(65) Prior Publication Data

US 2005/0018532 A1 Jan. 27, 2005

Related U.S. Application Data

(60) Provisional application No. 60/490,152, filed on Jul. 25, 2003, and provisional application No. 60/490,227, filed on Jul. 25, 2003.

(51) Int. Cl.$^7$ ............................. B01F 13/00; B01F 15/00
(52) U.S. Cl. ..................................... 366/129; 366/343
(58) Field of Search ................. 366/129, 198, 366/205, 343, 342; 241/282.1; 81/488

(56) References Cited

U.S. PATENT DOCUMENTS

| | | | |
|---|---|---|---|
| 950,056 A | 2/1910 | Rice | |
| 1,281,610 A | * 10/1918 | Lundahl | .................... 366/129 |
| 2,637,537 A | * 5/1953 | Arthur | ..................... 366/343 |
| 2,794,626 A | 6/1957 | Sterritt | |
| 2,990,978 A | 7/1961 | Charos | |
| 3,155,376 A | 11/1964 | Mollenbruck | |
| 3,417,972 A | 12/1968 | Vincent | |
| 3,895,548 A | * 7/1975 | Sauve | .......................... 81/488 |
| 4,030,707 A | 6/1977 | Moreton | |
| 4,201,487 A | 5/1980 | Backhaus | |
| 4,250,771 A | * 2/1981 | Berler | ..................... 241/282.1 |
| 4,397,427 A | * 8/1983 | Howard | .................... 241/282.1 |
| 4,552,461 A | 11/1985 | Ott et al. | |
| 4,561,782 A | 12/1985 | Jacobsen et al. | |
| 5,302,021 A | * 4/1994 | Jennett et al. | ............... 366/349 |
| 5,662,032 A | * 9/1997 | Baratta | ........................ 366/205 |
| 5,795,062 A | 8/1998 | Johnson | |
| 5,813,756 A | * 9/1998 | Proshan | ....................... 366/129 |
| 6,390,665 B1 | 5/2002 | Silveria | |
| 6,431,744 B1 | 8/2002 | Ash et al. | |
| 6,527,433 B2 | 3/2003 | Daniels, Jr. | |
| D473,421 S | 4/2003 | Daniels, Jr. | |
| D474,065 S | 5/2003 | Daniels, Jr. | |
| D474,067 S | 5/2003 | Daniels, Jr. | |
| D474,643 S | 5/2003 | Daniels, Jr. | |
| 2001/0006486 A1 | 7/2001 | Ofverberg | |
| 2002/0080678 A1 | 6/2002 | Daniels, Jr. | |
| 2003/0099154 A1 | 5/2003 | Daniels, Jr. | |

* cited by examiner

Primary Examiner—Tony G. Soohoo
(74) Attorney, Agent, or Firm—Kathy Mojibi Kavcioglu

(57) ABSTRACT

A stir stick assembly is disclosed having a stir stick body with a control end and a stirring end, opposite the control end. The stir stick body includes a plurality of sections that are detachably mated together. The stir stick body further defines a passageway extending from the control end to the stirring end.

20 Claims, 5 Drawing Sheets

STIR STICK ASSEMBLY FOR BLENDER APPARATUS

This is application is a continuation of U.S. provisional application Ser. No. 60/490,152 filed Jul. 25, 2003 and U.S. provisional application Ser. No. 60/490,227 filed Jul. 25, 2003.

FIELD OF INVENTION

The present invention relates generally to a stir stick and more particularly to a stir stick adapted for use with a blender apparatus.

BACKGROUND OF THE INVENTION

Blenders, smoothie makers and beverage mixers have become increasingly popular for making frosty drinks, such as milkshakes or smoothies. Milkshakes are typically made of ice cream and/or milk, and flavored as desired, with or without additives, such as candies, chocolates, peanut butter, flavored syrups, etc. Smoothies are typically healthier than milkshakes and are made with ice, frozen yogurt or sorbet, and fruit juice, and can include additives such as fruit, vitamins or supplements. Milkshakes, smoothies and other frosty drinks are hereinafter collectively referred to as "frozen beverages."

Restaurants and specialty food stores prepare frozen beverages using commercial quality blenders. When consumers attempt to replicate the frozen beverage recipes at home, they typically find their standard kitchen blender to be inadequate for the task. A disadvantage of the known kitchen blenders is that the blender gets clogged or otherwise stalled by the drink ingredients. Another disadvantage is that the ingredients are not sufficiently circulated through the blades so that large pieces of ice, fruit or other ingredients remain even after the beverage is fully mixed.

To ensure proper chopping and mixing of the ingredients, it is often necessary to supplement the blending by stirring the ingredients with a spoon or spatula. If the-blender is in operation when stirring the ingredients with a spoon or spatula, there is a danger of hitting the mixing blades with the spoon or spatula and this could result in contamination of the food, damage to the blender or injury to the person holding the spoon or spatula. Also, material pushed into the blades when the lid is not on the blender container is likely to be thrown upward out of the container by the rapidly rotating blades which will make a mess of walls, cabinets or counter space in the vicinity of the blender.

To avoid the danger and mess created by stirring the ingredient while the blender is in operation, the user must interrupt the blending process by turning the blender off, removing the lid and then stirring the ingredients. The disadvantage of this process is that it inconveniently lengthens the preparation time and adds numerous additional steps to the preparation process.

Thus, it is desirous to provide a stir stick for a blender apparatus that enables the user to stir the ingredients without presenting a danger to the user or creating a mess.

SUMMARY OF PREFERRED EMBODIMENTS

A stir stick assembly is disclosed having a stir stick body with a control end, and a stirring end opposite the control end. The stir stick body includes a plurality of sections that are detachably mated together. The stir stick body further defines a passageway extending from the control end to the stirring end to facilitate the addition of ingredients to the blender without requiring the user to turn the blender off.

DETAILED DESCRIPTION OF PREFERRED EMBODIMENTS

Figure 1:
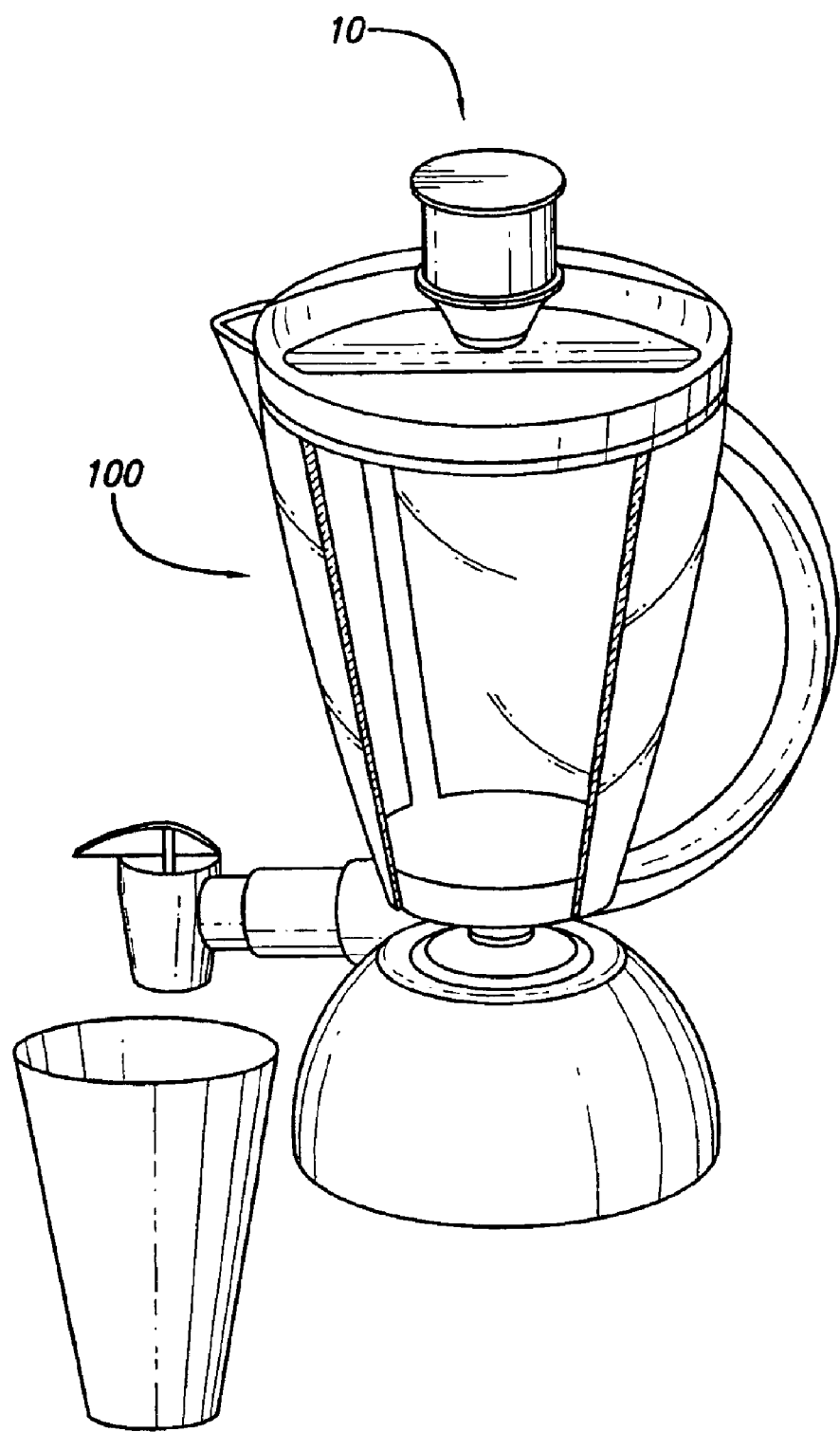
FIG. 1 is a perspective view of a preferred embodiment of the stir stick of the present invention as used in a blender apparatus.

FIG. 1 depicts a preferred embodiment of the stir stick assembly 10 of the present invention as positioned in a blender apparatus 100. For ease of reference, the stir stick assembly 10 is described as being used with a blender apparatus 100. However, it is envisioned that the stir stick assembly 10 of the present invention can be used with a variety of devices including smoothie makers, food processors or other mixing devices.

Figure 2:
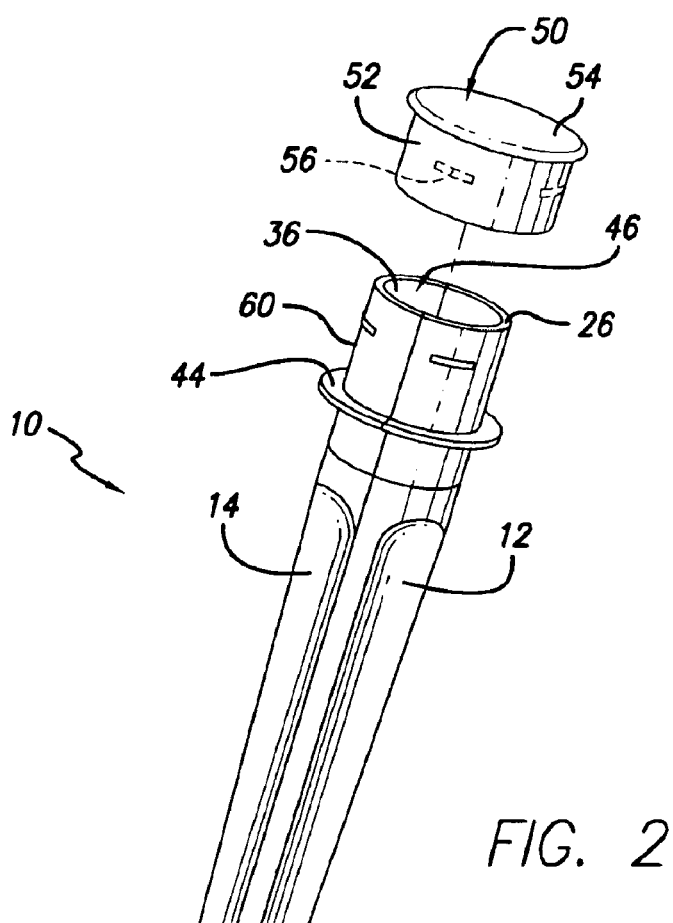
FIG. 2 is a perspective view of a preferred embodiment of the stir stick assembly of the present invention.

As shown in FIG. 2, the stir stick assembly 10 includes a first section 12 and a second section 14. The first and sections 12, 14 are shown as halves, however, the size of the sections can vary such that one is larger than the other. The first and second sections 12, 14 are mateable to form a stir stick. In a preferred embodiment of the invention, shown in FIG. 3, the first section 12 includes a first interlocking member 16 that corresponds to a second interlocking member 18 on the second section 14. The first interlocking member 16 is configured to securely engage the second interlocking member 18 to form a stir stick. In the embodiment shown in FIGS. 3 through 5, the first interlocking member 16 is a tapered channel having a wide end 20 at a first end 26 of the first section 12, and a narrow end 22 at the second end 28 of the first section 12.

Figure 3:
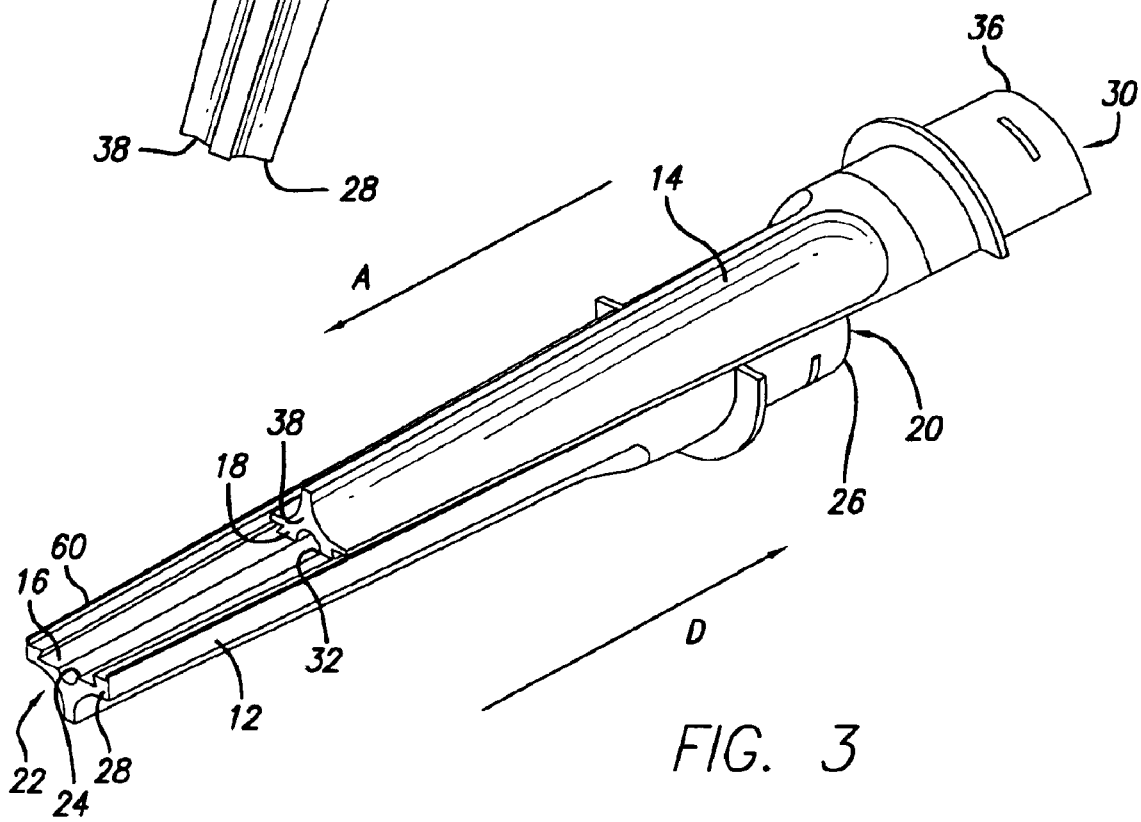
FIG. 3 is a perspective view of a preferred embodiment of the stir stick assembly of the present invention in a partially assembled state.
Figure 4:
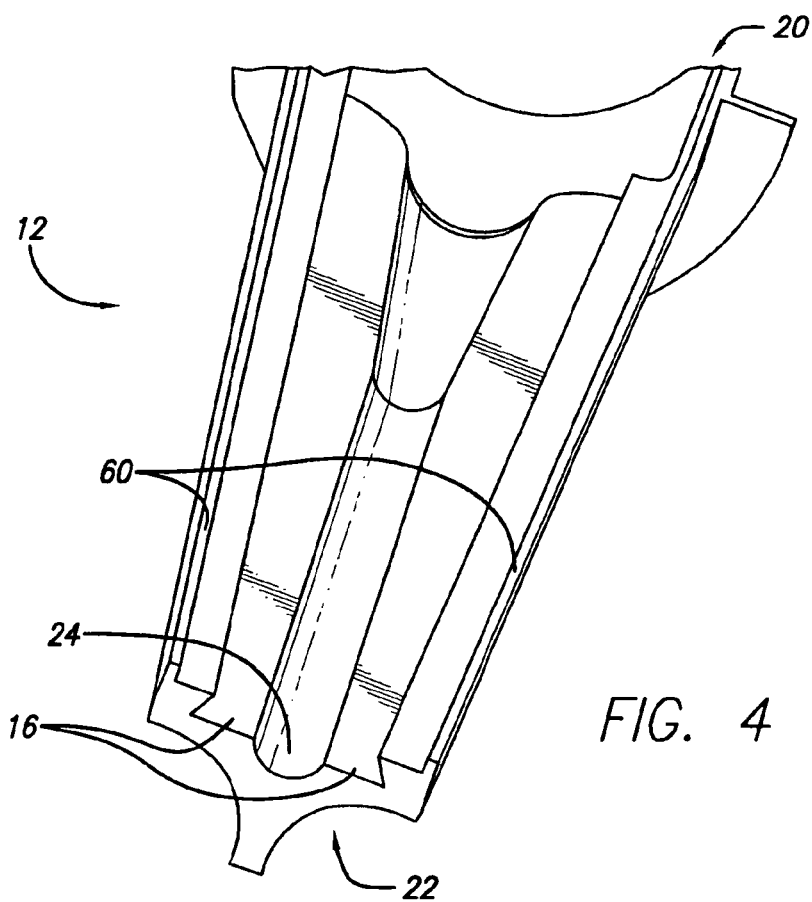
FIG. 4 is a perspective view of a preferred embodiment of a first section of the stir stick of the present invention.
Figure 5:
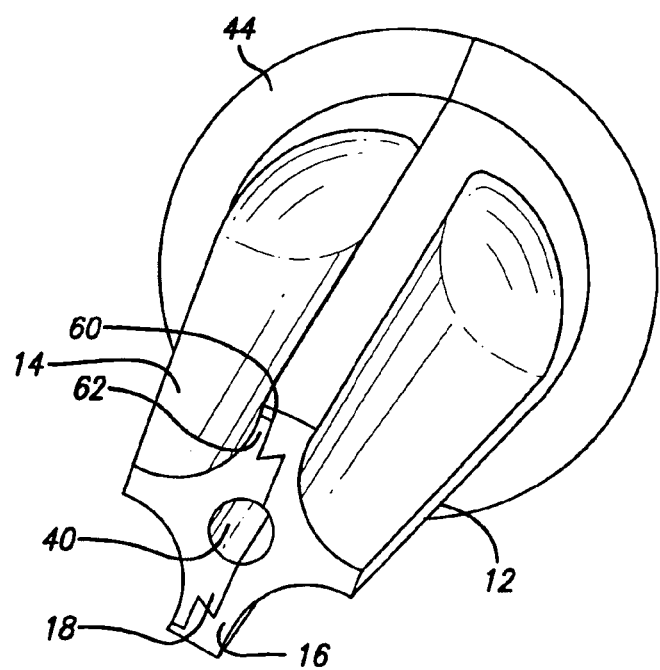
FIG. 5 is a perspective view of a first section and a second section interlocked to form a preferred embodiment of the stir stick of the present invention.

In the embodiments shown in FIGS. 3 through 5, the second interlocking member 18 is a protrusion adapted to fit into the tapered channel that is the first interlocking member 16. The shape of the second interlocking member 18 corresponds to the shape of the first interlocking member 16, such that the second interlocking member 18 has a wide end 30 at a first end 36 of the second section 14, and a narrow end 32 at the second end 28 of the second section 14.

As shown in FIG. 3, the first and second sections 12, 14 mate with each other as the first interlocking member 16 engages the second interlocking member 18. The assembly of a preferred embodiment of the stir stick will now be discussed in reference to FIG. 3. To assemble the stir stick, the narrow end 32 of the protruding second interlocking member 18 is inserted into the channel of the first interlocking member 16 at the wide end 20 of the first interlocking member 16. The narrow end 32 of the second interlocking member 18 slides toward the narrow end 22 of the first interlocking member 16 in the direction designated as A in FIG. 3. The first and second interlocking members 16, 18 are sized such that when the narrow end 32 of the second interlocking member 18 arrives at the narrow end 22 of the first interlocking member 16, the first and second sections 12, 14 are secured to each other, and the second interlocking member 18 can not be moved any further in direction A. At this point, the stir stick is in an assembled configuration.

In the assembled configuration, the first end 26 of the first section 12 is substantially aligned with the first end 36 of the second section 14; and the second end 28 of the first section 12 is substantially aligned with the second end 38 of the second section 14. In a preferred embodiment of the invention, the first section 12 defines a first concave groove 24 therein and the second section 14 defines a second concave groove 34. In an assembled configuration, the first and second concave grooves 24, 34 form a passageway 40 for liquid or solids to be added to the beverage mix in the blender 100.

Figure 6:
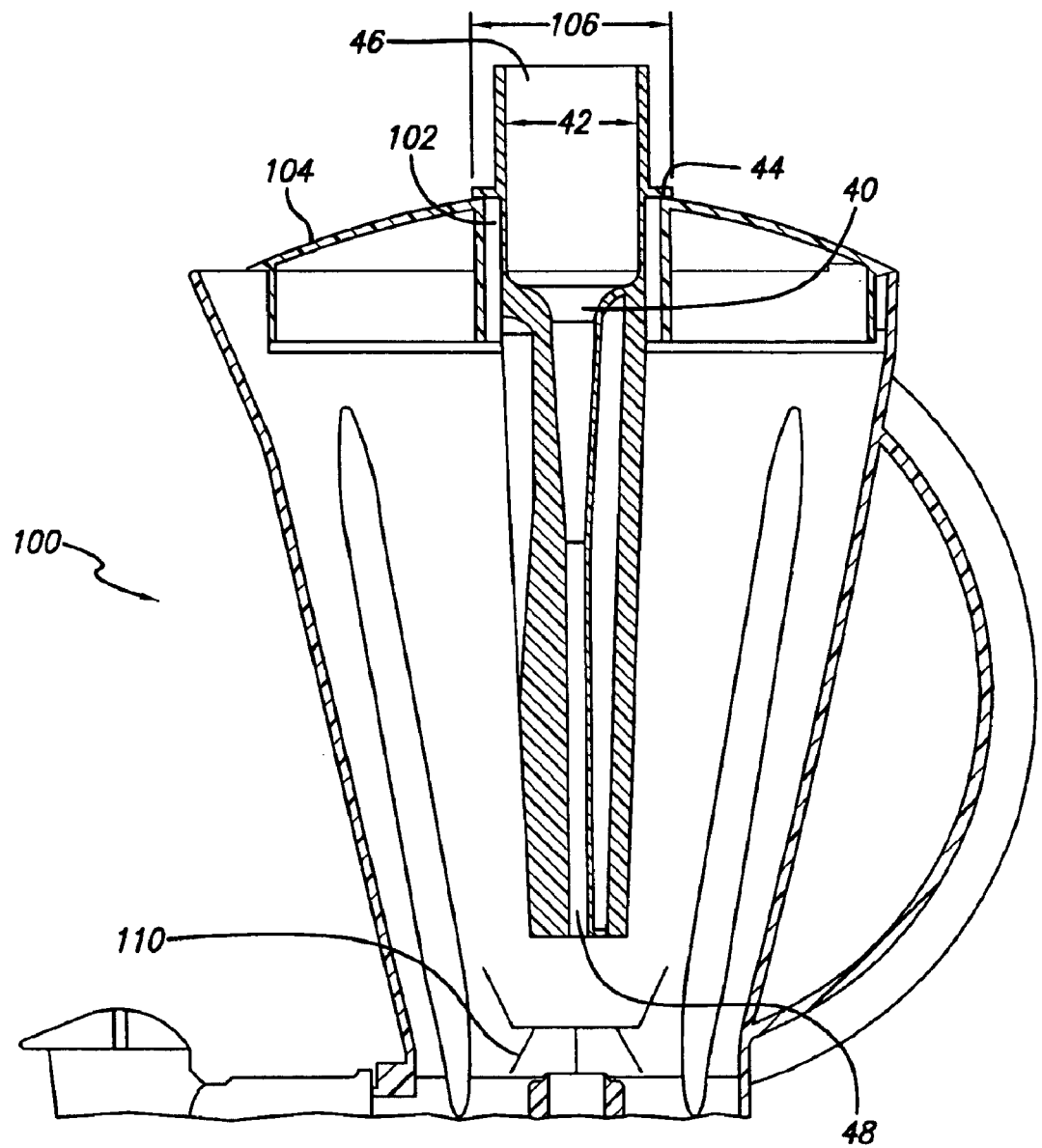
FIG. 6 is a cross-sectional side view of a preferred embodiment of the stir stick of the present invention as used in a blender apparatus.

FIG. 6 depicts a cross-sectional view of a preferred embodiment of the stir stick assembly 10 as installed in a blender apparatus 100. As shown in FIG. 6, the stir stick assembly 10 provides a passageway 40 therethrough. The stir stick assembly is preferably installed in an opening 102 in the lid 104 of the blender apparatus. The diameter 106 of the opening 102 in the blender lid 104 is preferably larger than the diameter 42 of the stir stick assembly 10 to allow sufficient clearance for one to move or rock the stir stick back and forth or up and down in order to facilitate the mixing of the frozen beverage. The diameter 106 of the opening 102 can be varied to increase or decrease the clearance for the rocking or movement of the stir stick assembly.

To prevent the stir stick assembly 10 from falling through the opening 102 of the blender lid 104, the stir stick assembly 10 is provided with a collar 44 that extends beyond the opening 102. In a preferred embodiment of the invention, the collar 44 is a continuous flange around the periphery of the stir stick assembly 10. However, the collar 44 can be any known structure that prevents the stir stick assembly 10 from falling through opening 102. For example, in one embodiment of the invention, the collar 44 is a plurality of tabs that extend radially from the stir stick assembly.

In a preferred embodiment of the invention, the stir stick assembly 10 is installed in an opening in the center of the blender lid 104. The central position of the stir stick assembly 10 enables the user to be able to stir the frozen beverage from the center of the mixture. Furthermore, the stir stick assembly 10 is preferably positioned such that the outlet 48 of the passageway 40 is positioned directly above the blades 110. The passageway 40 enables the user to add ingredients to the frozen beverage while the blender is in use without the frozen beverage splattering out of the blender. Liquid poured through the inlet 46 of the passageway 40 will exit at the passageway outlet 48, directly above blades 110. The outlet 48 is preferably positioned to facilitate the mixing of the added ingredients with the frozen beverage by delivering the added ingredients to the mixing blades 110 or very close to the mixing blades 110.

As shown in FIGS. 4 and 5, to prevent seepage of liquid from the passageway 40 and to further secure the second interlocking member 18 with the first interlocking member 16, the first section 12 preferably includes a seal edge 60. The seal edge 60 preferably contacts the outermost edge 62 of the second section 14, providing a seal to prevent escape of liquid from the passageway 40.

Figure 7:
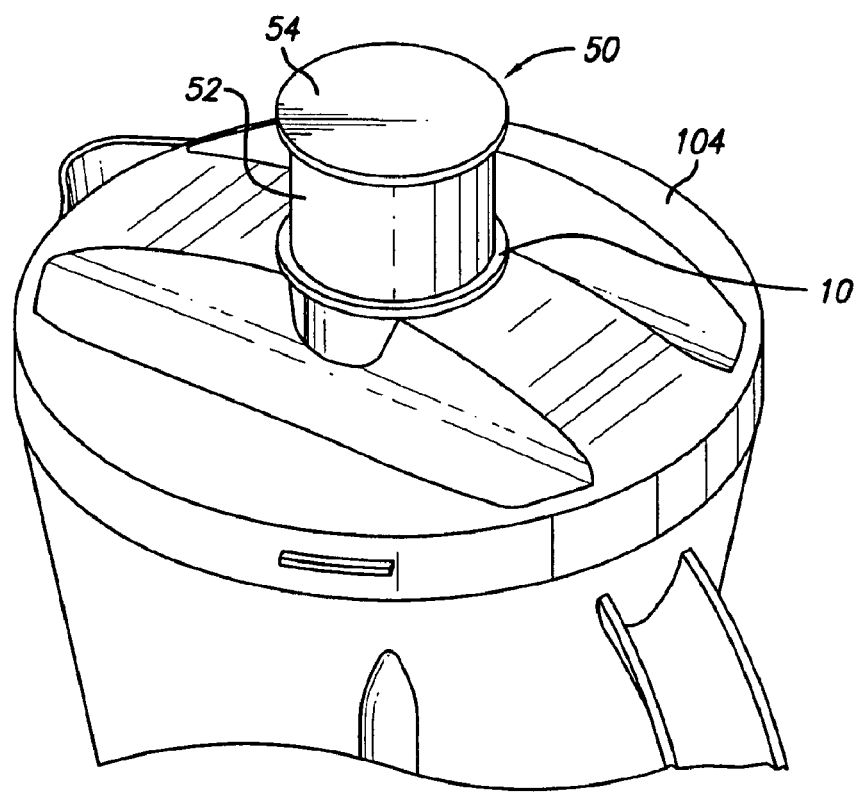
FIG. 7 is a perspective view of a preferred embodiment of the stir stick of the present invention as positioned in the lid of a blender container with a lid placed thereon.

As shown in FIG. 7, when the passageway 40 is not in use, a cap 50 is provided to cover the passageway inlet 46. Cap 50 preferably has the same shape as the passageway inlet 46 and is dimensioned to cover the inlet. In a preferred embodiment of the invention, cap 50 includes a cylindrical body 52 and a disc-shaped top 54. The cylindrical body 52 fits around a top portion of the stir stick. In a preferred embodiment, as shown in FIG. 2, the cylindrical body 52 carries at least one interlocking member 56, and preferably a plurality of interlocking members 56. The interlocking members 56 are positioned on the inner surface of the cylindrical body 52. The stir stick preferably carries interlocking members 66 corresponding to the interlocking members 56 on the cap 50. The cap 50 is removably attached to the stir stick by positioning the cap on the stir stick and twisting the cap to align the interlocking members 56 and 66. When the interlocking members 56 and 66 are aligned, it is not possible to move the cap axially with respect to the stir stick. In this regard, the cap is locked onto the stir stick. To unlock the cap, the cap is rotated with respect to the stir stick such that the interlocking members 56 and 66 are not aligned. The cap will then be removable from the stir stick.

Figure 8:
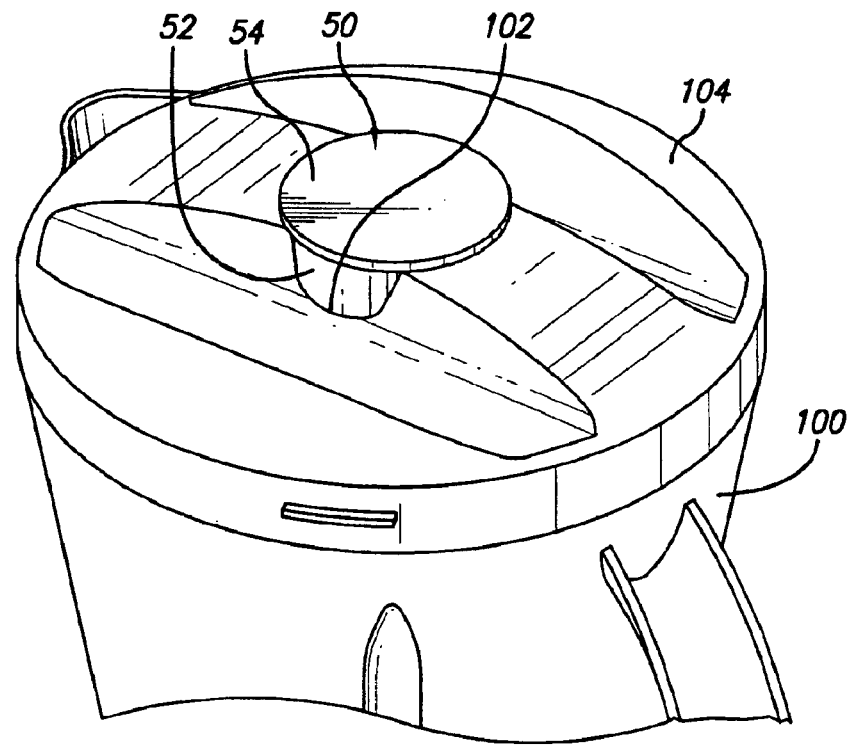
FIG. 8 is a perspective view of the stir stick lid installed directly in the lid of the blender container.

As shown in FIG. 8, in a preferred embodiment of the invention, when the stir stick is not used, cap 50 is dimensioned to cover the opening 102 in the blender lid 104. Specifically, the cylindrical body 52 of the cap 50 is positioned in the opening 102 and the disc-shaped top 54 is dimensioned to prevent the cap 50 from falling into opening 102. Thus, cap 50 can serve a dual purpose of covering the stir stick and covering the blender lid opening, when the stir stick is not used.

After each use, the stir stick can be disassembled to facilitate the cleaning of the stir stick. Specifically, as shown in FIG. 3, the second section 14 slides in the direction D with respect to first section 12, moving the narrow end 32 of the second interlocking member 18 away from the narrow end 22 of the first interlocking member 16. When the stir stick is disassembled, the first and second section 12, 14 separate and each section can be separately cleaned.

It is envisioned that any known interlocking members can be used to detachably secure the first and second sections of the stir stick to each other. As such, the invention should not be limited to the specific interlocking members described herein.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A stir stick assembly, comprising a stir stick body having a control end and a stirring end opposite the control end, the stir stick body having a plurality of sections that are detachably mated together, the stir stick body defining a passageway extending from the control end to the stirring end, and a detachable cap at an opening passageway of the control end so as to enable the user to add ingredients into the blender while the blender is in use.

2. The stir stick assembly of claim 1 wherein the plurality of sections comprises a first section and a second section detachably mateable with the first section.

3. The stir stick assembly of claim 2 wherein the first section comprises a first interlocking member and the second section comprises a second interlocking member that corresponds to and mates with the first interlocking member.

4. The stir stick assembly of claim 1, further comprising means for detachably mating the first section and the second section.

5. The stir stick assembly of claim 1 wherein the cap interlocks with the stir stick body.

6. The stir stick assembly of claim 1 further comprising interlocking means for removably attaching the cap to the stir stick body.

7. A stir stick assembly, comprising:
a stir stick body having a control end and a stirring end opposite the control end;
the stir stick body comprising a first section with a first interlocking member and a second section having a second interlocking member;
wherein the first interlocking member comprises a channel having a narrow end and a wide end, and the second interlocking member comprises a protrusion having a narrow end and a wide end, wherein the second interlocking member slidingly engages the first interlocking member, and wherein in an assembled state, the narrow end of the protrusion is substantially aligned with the narrow end of the channel.

8. The stir stick assembly of claim 7, further comprising a cap adapted to fit the control end of the stir stick body.

9. A stir stick assembly for use with a blender apparatus for mixing the contents therein, the blender apparatus having a lid with an opening therein, the stir stick assembly comprising means for stirring the contents of the blender apparatus and a detachable cap, wherein the stirring means extends through the opening in the blender lid and wherein the stirring means defines a passageway therethrough, wherein the passageway extends from a first end of the stirring means to a second end, and wherein the detachable cap attaches at a first end of the stirring means.

10. The stir stick assembly of claim 9 wherein the stirring means comprises a stir stick body having a control end and a stirring end, opposite the control end, wherein the control end is positioned on a first side of the blender lid, and the stirring end is positioned at a second side of the blender lid, the stir stick body having a plurality of sections that are detachably mated together.

11. The stir stick assembly of claim 10 wherein the diameter of the opening is larger than a diameter of the stir stick body, and wherein the stir stick body comprises a collar extending therefrom.

12. The stir stick assembly of claim 11 wherein the plurality of sections comprises a first section and second section mateable with the first section.

13. The stir stick assembly of claim 12 further comprising means for detachably mating the first and second sections.

14. The stir stick assembly of claim 11 wherein the first section comprises a first interlocking member and the second section comprises a second interlocking member that corresponds to and mates with the first interlocking member.

15. A stir stick assembly in combination with a blender apparatus, the combination comprising:
a blender apparatus having a lid with an opening therein;
the stir stick assembly comprising a stir stick body extending through the opening of the blender lid, the stir stick body having a control end and a stirring end opposite the control end, wherein the control end is positioned on a first side of the blender lid, and the stirring end is positioned on a second side of the blender lid;
the stir stick body comprising a first section with a first interlocking member and a second section with a second interlocking member;
wherein the first interlocking member comprises a channel having a narrow end and a wide end, and the second interlocking member comprises a protrusion having a narrow end and a wide end, wherein the second interlocking member slidingly engages the first interlocking member, and wherein in an assembled state, the narrow end of the protrusion is substantially aligned with the narrow end of the channel.

16. The stir stick assembly of claim 15 wherein the first interlocking member comprises a seal edge that contacts an outermost edge of the second interlocking member.

17. The stir stick assembly of claim 15, further comprising a cap adapted to fit the control end of the stir stick body and the opening of the blender lid.

18. A stir stick assembly for use with a blender apparatus for mixing the contents therein, the blender apparatus having a lid with an opening therein, the stir stick assembly comprising a stir stick body extending through the blender lid opening, the stir stick body having a control end and a stirring end opposite the control end, the stir stick body having a plurality of sections that are detachably mated together and defining a passageway extending from the control end to the stirring end, and a detachable cap at the control end of the passageway.

19. The stir stick assembly of claim 18 wherein the plurality of sections comprises a first section and second section mateable with the first section, wherein the first section comprises a first interlocking member and the second section comprises a second interlocking member that corresponds to and mates with the first interlocking member.

20. The stir stick assembly of claim 18 further plurality of sections.

* * * * *